US011664756B2

(12) United States Patent
Matsuo et al.

(10) Patent No.: US 11,664,756 B2
(45) Date of Patent: May 30, 2023

(54) POWER CONVERSION DEVICE AND MOTOR VEHICLE SYSTEM INCLUDING THE SAME

(71) Applicant: HITACHI ASTEMO, LTD., Hitachinaka (JP)

(72) Inventors: Kentaro Matsuo, Hitachinaka (JP); Noriya Nakao, Tokyo (JP); Kenichi Yoshida, Hitachinaka (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 73 days.

(21) Appl. No.: 17/605,322

(22) PCT Filed: Mar. 13, 2020

(86) PCT No.: PCT/JP2020/011017
§ 371 (c)(1),
(2) Date: Oct. 21, 2021

(87) PCT Pub. No.: WO2020/217764
PCT Pub. Date: Oct. 29, 2020

(65) Prior Publication Data
US 2022/0209702 A1 Jun. 30, 2022

(30) Foreign Application Priority Data
Apr. 23, 2019 (JP) .............. JP2019-081759

(51) Int. Cl.
*H02P 27/08* (2006.01)
*H02P 23/14* (2006.01)
*B60R 16/02* (2006.01)

(52) U.S. Cl.
CPC .............. *H02P 27/08* (2013.01); *B60R 16/02* (2013.01); *H02P 23/14* (2013.01)

(58) Field of Classification Search
CPC .......... H02P 27/00; H02P 27/04; H02P 27/06; H02P 27/08; H02P 29/00; H02P 29/50;
(Continued)

(56) References Cited

U.S. PATENT DOCUMENTS

2004/0232877 A1 11/2004 Kawaji et al.
2008/0157710 A1 7/2008 Tobari et al.
(Continued)

FOREIGN PATENT DOCUMENTS

JP 2004-104898 A 4/2004
JP 2004-320985 A 11/2004
(Continued)

OTHER PUBLICATIONS

International Search Report with English translation and Written Opinion issued in corresponding application No. PCT/JP2020/011017 dated Jul. 7, 2020.

*Primary Examiner* — Antony M Paul
(74) *Attorney, Agent, or Firm* — Foley & Lardner LLP

(57) ABSTRACT

Provided is a power conversion device that does not require adaptation work and can suppress a current beat regardless of an operation state of a motor. The power conversion device includes an inverter 1 that converts a DC voltage into an AC voltage and drives an AC motor 2, and beat compensation units 46 and 49 that suppress a current beat component of an output current of the inverter 1. The beat compensation units 46 and 49 include beat extraction units 50, 51, and 52 that calculate beat components of the output current of the inverter 1, and beat compensation voltage calculation units 53 and 54 that estimate beat compensation voltages from the beat components calculated by the beat extraction units 50, 51, and 52. The current beat component of the output current of the inverter 1 is suppressed based on
(Continued)

the beat compensation voltages estimated by the beat compensation voltage calculation units 53 and 54.

12 Claims, 4 Drawing Sheets

(58) Field of Classification Search
CPC .............. H02P 29/032; H02P 2207/05; H02P 2207/01; H02P 21/00; H02P 21/0003; H02P 21/0017; H02P 21/14; H02P 21/22; H02P 21/34; H02P 23/00; H02P 23/14; H02P 25/00; H02P 25/022; H02P 25/062; H02P 25/064; H02P 25/092; H02P 6/00; H02P 6/005; H02P 6/08; H02P 6/10; H02P 6/28; H02P 6/32; H02P 7/00; H02P 7/29; H02P 1/00; H02P 1/04; H02P 1/16; H02P 1/18; H02P 1/24; H02P 1/26; H02P 1/28; H02P 1/423; H02P 1/46; H02P 1/465; H02P 3/00

See application file for complete search history.

(56) References Cited

U.S. PATENT DOCUMENTS

| | | |
|---|---|---|
| 2018/0191288 A1 | 7/2018 | Li et al. |
| 2019/0052210 A1 | 2/2019 | Li et al. |
| 2020/0007049 A1* | 1/2020 | Kitano .................. H02M 1/126 |

FOREIGN PATENT DOCUMENTS

| | | |
|---|---|---|
| JP | 2005-110335 A | 4/2005 |
| JP | 2006-340486 A | 12/2006 |
| JP | 2008-167568 A | 7/2008 |
| JP | 2010-063335 A | 3/2010 |
| JP | 2017-017817 A | 1/2017 |
| JP | 2018-113770 A | 7/2018 |

* cited by examiner

POWER CONVERSION DEVICE AND MOTOR VEHICLE SYSTEM INCLUDING THE SAME

TECHNICAL FIELD

The present invention relates to a power conversion device and a motor vehicle system including the same.

BACKGROUND ART

In power conversion devices used in AC motors, a current beat phenomenon occurs in which a low-frequency component slower than a fundamental frequency is superimposed on a phase current flowing through a motor due to an error in a sensor signal value used for control, an output voltage error of an inverter, or the like. This phenomenon causes a pulsation of an output torque of the motor and deterioration in efficiency.

Further, the phase current is offset by a current beat, a current larger than an amplitude value of the phase current flows. Typically, an overcurrent protection function is mounted on the inverter, and thus, there is also a problem that overcurrent protection works by the current beat so that the inverter stops.

In particular, in a case where a switching frequency of the inverter is not sufficiently higher than the fundamental frequency of the current flowing through the motor, a voltage difference occurs between a positive output and a negative output of the inverter so that the current beat occurs.

In a case where a high-rotation motor is driven, a fundamental frequency of a current flowing through the motor is high, and an impedance of the motor is small, so that a large current beat occurs.

As a countermeasure against the current beat, the following methods have been proposed.

PTL 1 discloses, as a current beat suppression device, a method of extracting pulsation components on d-q axes by a high-pass filter (HPF) and performing three-phase conversion on the pulsation components to calculate a current beat component of each of the three phases, and performing proportional integral operation (PI compensation) on the calculated current beat component to compensate a three-phase voltage command.

PTL 2 describes a method of subtracting a value, obtained by three-phase conversion of d-axis and q-axis current command values from actual values of a three-phase current to extract a current beat component, and converting the current beat component into an amplitude and a phase using a phase locked loop (PLL) to suppress a current beat.

PTL 3 describes a method of extracting pulsation components in a rotating coordinate system by a high-pass filter (HPF) and performing three-phase conversion on the pulsation components to calculate a current beat component of each of the three phases, and performing proportional operation (P compensation) on the current beat component to compensate a three-phase voltage command.

PTL 4 describes a method of detecting a DC voltage of an inverter by a voltage sensor, calculating a ripple frequency from a detected voltage signal, and compensating d-axis and q-axis voltage command values using a controller that amplifies only a component of the ripple frequency.

CITATION LIST

Patent Literature

PTL 1: JP 2010-063335 A
PTL 2: JP 2017-017817 A
PTL 3: JP 2004-104898 A
PTL 4: JP 2018-113770 A

SUMMARY OF INVENTION

Technical Problem

In the method described in PTL 1, however, the HPF is used to extract the current beat component and a PI compensator is used, and thus, it is necessary to perform adaptation work for a cutoff frequency of the HPF and a gain of the PI compensator. This causes an increase in the number of development steps of a power conversion device. Further, when a frequency of an assumed current beat component is substantially equal to a fundamental frequency in a low-rotation range where a current beat is unlikely to occur, there is a possibility that a fundamental wave component is detected as the current beat component. In this case, it is necessary to stop a compensation operation for the current beat component, which is likely to affect an operation of a current control system essential for torque control of the motor.

Further, the PLL is used to convert the current beat component into the amplitude and phase in the method described in PTL 2. This method has a problem that the response is slow when a frequency of the current beat component is unknown.

Further, it is impossible to completely suppress the current beat component in principle in the method described in PTL 3 since a P compensator is used.

Furthermore, in the method described in PTL 4, it is possible to suppress a current beat phenomenon caused by the pulsation of the DC voltage of the inverter, but it is difficult to suppress a current beat phenomenon caused by other factors.

An object of the present invention is to realize a power conversion device, which does not require adaptation work and can suppress a current beat regardless of an operation state of a motor, and a motor vehicle system including the same.

Solution to Problem

In order to achieve the above object, the present invention is configured as follows.

A power conversion device includes: an inverter that converts a DC voltage into an AC voltage and drives an AC motor; and a beat compensation unit that suppresses a current beat component of an output current of the inverter. The beat compensation unit includes a beat extraction unit that calculates a beat component of the output current of the inverter and a beat compensation voltage calculation unit that estimates a beat compensation voltage from the beat component calculated by the beat extraction unit, and suppresses the current beat component of the output current of the inverter based on the beat compensation voltage estimated by the beat compensation voltage calculation unit.

A motor vehicle system includes: a motor that drives a vehicle; and a motor control device that controls the motor. The motor control device includes a power conversion device. The power conversion device includes: an inverter that converts a DC voltage into an AC voltage and drives an AC motor; and a beat compensation unit that suppresses a current beat component of an output current of the inverter. The beat compensation unit includes a beat extraction unit that calculates a beat component of the output current of the inverter and a beat compensation voltage calculation unit that estimates a beat compensation voltage from the beat component calculated by the beat extraction unit, and suppresses the current beat component of the output current of the inverter based on the beat compensation voltage estimated by the beat compensation voltage calculation unit.

Advantageous Effects of Invention

According to the present invention, it is possible to realize the power conversion device that does not require the adaptation work and can suppress the current beat regardless of the operation state of the motor, and the motor vehicle system including the same.

Other objects, configurations, and effects which have not been described above become apparent from embodiments to be described hereinafter.

DESCRIPTION OF EMBODIMENTS

Hereinafter, embodiments of the present invention will be described with reference to the attached drawings. Incidentally, the same elements will be denoted by the same reference signs in the respective drawings, and the redundant description thereof will be omitted.

Embodiments

First Embodiment

Figure 1:
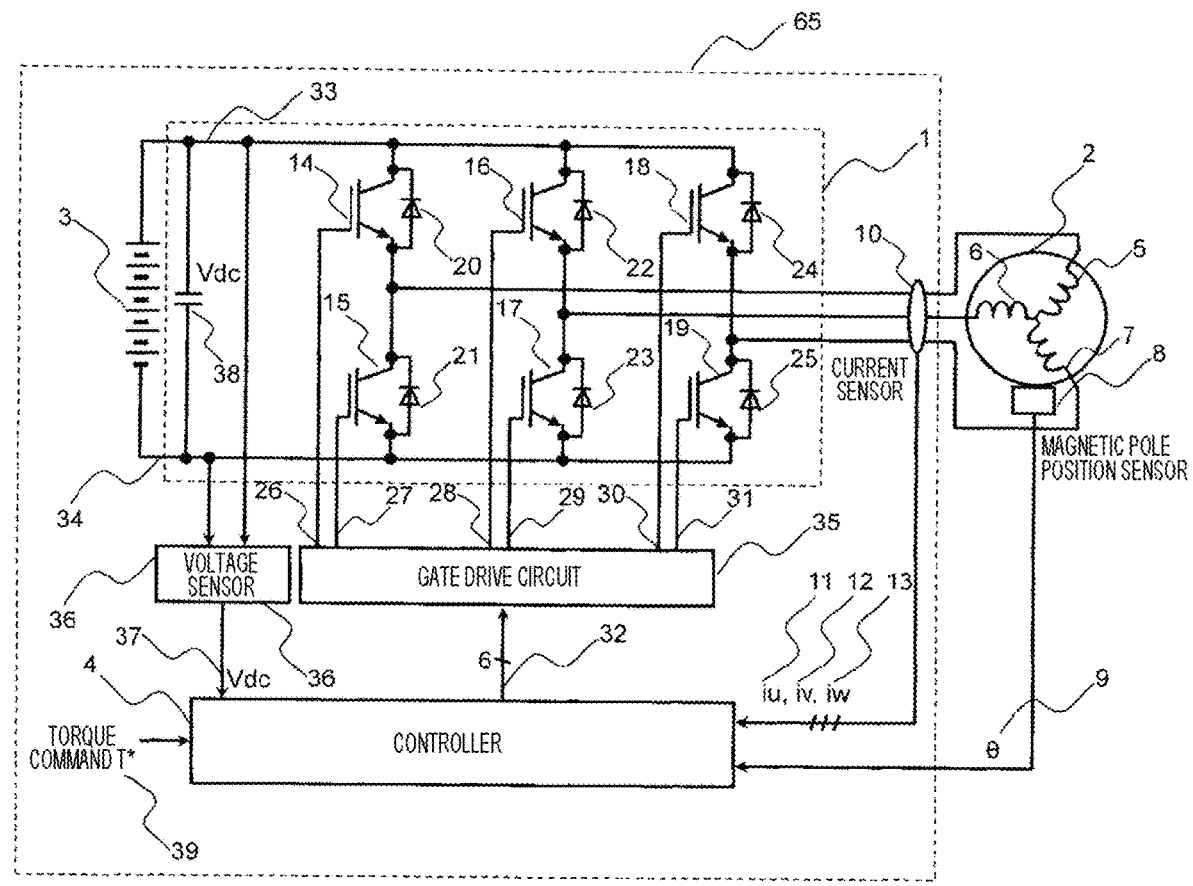
FIG. 1 is a diagram illustrating a schematic circuit configuration of a power conversion device according to a first embodiment.

FIG. 1 is a diagram illustrating a schematic circuit configuration of a power conversion device according to a first embodiment of the present invention.

In FIG. 1, the power conversion device of a motor 2 mainly includes an inverter 1, a battery 3, a controller 4, and the like.

The inverter 1 is a three-phase voltage-type two-level inverter.

The motor 2 is connected to a drive mechanism of a motor vehicle system to be described later, and the motor 2 rotates to propel a vehicle. The motor 2 of the first embodiment is an AC motor, and is a three-phase interior permanent magnet synchronous motor (IPMSM). The motor 2 operates by an interaction between a magnetic flux generated from a permanent magnet provided in a rotor (not illustrated) and a magnetic field generated by currents iu, iv, and iw flowing through three-phase windings 5, 6, and 7 fixed to an armature. Here, iu, iv, and iw represent a U-phase current, a V-phase current, and a W-phase current, respectively.

The motor 2 includes a magnetic pole position sensor 8. The magnetic pole position sensor 8 has a function of detecting a magnetic pole position of the rotor of the motor 2 as a rotation angle. The magnetic pole position sensor 8 outputs a magnetic pole position signal 9 ($\theta$) to be input to the controller 4. Processing of the magnetic pole position signal 9 ($\theta$) in the controller 4 will be described later with reference to FIG. 2.

The current sensor 10 detects currents flowing through the windings 5, 6, and 7, outputs a U-phase current sensor signal 11 (signal indicating the current iu), a V-phase current sensor signal 12 (signal indicating the current iv), and a W-phase current sensor signal 13 (signal indicating the current iw) based on the detected currents to be input to the controller 4.

Processing of the current sensor signals 11, 12, and 13 in the controller 4 will also be described later with reference to FIG. 2.

The inverter 1 includes switching elements 14, 15, 16, 17, 18, and 19 and freewheeling diodes 20, 21, 22, 23, 24, and 25. Each of the switching elements 14 to 19 of the first embodiment is a Si-IGBT and includes a gate terminal, a collector terminal, and an emitter terminal. Each of the freewheeling diodes 20 to 25 is connected between the collector terminal and the emitter terminal of each of the switching elements 14 to 19.

When the collector terminal has a higher potential than the emitter terminal in each of the switching elements 14 to 19, each of the freewheeling diodes 20 to 25 prevents a current from flowing through the freewheeling diodes 20 to 25 and prevents a high reverse voltage from being applied to the switching elements 14 to 19. Switching of on and off of each of the switching elements 14 to 19 is performed by each of gate drive signals 26, 27, 28, 29, 30, and 31 connected to the gate terminals of the respective switching elements 14 to 19.

Six gate signals 32 that are the basis of the gate drive signals 26 to 31 are generated by the controller 4 and output to a gate drive circuit 35. The gate drive circuit 35 converts the gate signals 32 into potentials necessary for switching the switching elements 14, 15, 16, 17, 18, and 19 between on and off, and outputs the gate drive signals 26, 27, 28, 29, 30, and 31. The generation of the gate signal 32 in the controller 4 will be described later with reference to FIG. 2.

The emitter terminal of the switching element 14 and the collector terminal of the switching element 15 are connected to each other, and the connection point thereof is connected to the winding 5 to allow the flow of the current iu. The emitter terminal of the switching element 16 and the collector terminal of the switching element 17 are connected to each other, and the connection point thereof is connected to the winding 6 to allow the flow of the current iv. The emitter terminal of the switching element 18 and the collector terminal of the switching element 19 are connected to each other, and the connection point thereof is connected to the winding 7 to allow the flow of the current iw. The collector terminals of the switching elements 14, 16, and 18 are connected to each other and connected to a high-potential DC wiring 33. Further, the emitter terminals of the switching elements 15, 17, and 19 are connected to each other and connected to a low-potential DC wiring 34.

As a result, the controller 4 turns on and off the switching elements 14, 15, 16, 17, 18, and 19 at appropriate timings based on the generated gate signals 32, and controls the currents iu, iv, and iw flowing through the windings 5, 6, and 7 to realize rotation control of the motor 2. The gate signal 32 is in a form of a pulse width modulation (PWM) signal such that the currents iu, iv, and iw are sinusoidal signals having phases different from each other by 120 degrees.

A voltage sensor 36 is connected to the high-potential DC wiring 33 and the low-potential DC wiring 34, and detects a potential difference therebetween. Since the potential difference between the high-potential DC wiring 33 and the low-potential DC wiring 34 is typically a high voltage of, for example, 100 V or more, the voltage sensor 36 generates a DC voltage sensor signal 37 (Vdc), converted into a low voltage detectable by the controller 4, and inputs the DC voltage sensor signal to the controller 4.

A smoothing capacitor 38 included in the inverter 1 is connected between the high-potential DC wiring 33 and the low-potential DC wiring 34. The smoothing capacitor 38 has a function of suppressing a pulsation of a DC voltage generated by each switching operation of the switching elements 14 to 19.

In the battery 3, a terminal on the high potential side of the battery 3 is connected to the high-potential DC wiring 33, and a terminal on the low potential side of the battery 3 is connected to the low-potential DC wiring 34. As a result, the battery 3 serves as a DC power supply that supplies power to the inverter 1 and the motor 2.

A torque command 39 (T*) given from a host controller of a vehicle, such as an electronic control unit (ECU), is input to the controller 4. The controller 4 performs torque control of the motor 2 based on the torque command 39 (T*).

Figure 2:
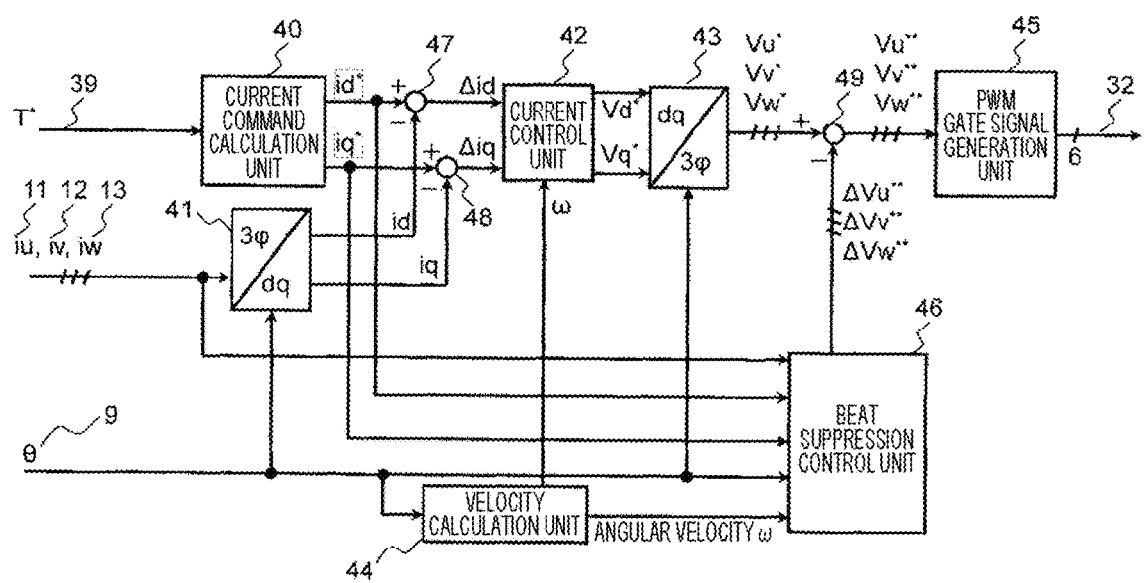
FIG. 2 is a processing block diagram for describing processing of a controller of the first embodiment.

FIG. 2 is a processing block diagram illustrating processing of the controller 4 according to the first embodiment of the present invention.

In FIG. 2, processing blocks of the controller 4 include a current command calculation unit 40, a three-phase/two-phase conversion unit 41, a current control unit 42, a two-phase/three-phase conversion unit 43, a velocity calculation unit 44, a PWM gate control signal generation unit (control signal generation unit) 45, a beat suppression control unit 46, a deviation calculator 47, and a deviation calculator 48. The current command calculation unit 40, the three-phase/two-phase conversion unit 41, the current control unit 42, the two-phase/three-phase conversion unit 43, the deviation calculator 47, and the deviation calculator 48 form a three-phase voltage command value generation unit.

The controller 4 performs the rotation control by causing the three-phase currents iu, iv, and iw to flow through the motor 2. Inside the controller 4, a so-called current vector control method is used in which processing is performed in a coordinate system obtained by converting a three-phase fixed coordinate into a two-phase rotating coordinate represented by a d-axis and a q-axis.

The current command calculation unit 40 calculates a d-axis current command value id* and a q-axis current command value iq*. The torque command 39 (T*), a rotational angular velocity ω, and the DC voltage sensor signal 37 (Vdc) are input to the current command calculation unit 40, and the d-axis current command value id* and the q-axis current command value iq* are calculated from these inputs. The rotational angular velocity ω is calculated by the velocity calculation unit 44 based on the magnetic pole position signal 9 (θ).

In a synchronous motor having magnetic saliency such as IPMSM, a torque T is expressed by the following Formula (1) and depends on a current.

$$T = Pp \cdot \{F + (Ld - Lq)id\} \cdot iq \quad (1)$$

In Formula (1), id is a d-axis current, iq is a q-axis current, Pp is the number of pole pairs, Ld is a d-axis inductance, Lq is a q-axis inductance, and F is a magnetic flux.

The magnetic pole position signal 9 (θ) is input to the three-phase/two-phase conversion unit 41 and the two-phase/three-phase conversion unit 43, and is used for conversion between a two-phase coordinate and a three-phase coordinate of the d-axis and q-axis.

The three-phase/two-phase conversion unit 41 performs coordinate conversion on the current sensor signals 11 (iu), (iv), and 13 (iw) into the d-axis and q-axis based on information on the magnetic pole position signal 9 (θ), and outputs a d-axis detection current id and a q-axis detection current iq.

The deviation calculator 47 calculates a deviation between the d-axis current command value id* output from the current command calculation unit 40 and the d-axis sensing current id output from the three-phase/two-phase conversion unit 41, and outputs a d-axis current deviation Δid to the current control unit 42.

The deviation calculator 48 calculates a deviation between the q-axis current command value iq* output from the current command calculation unit 40 and the q-axis sensing current iq output from the three-phase/two-phase conversion unit 41, and outputs a q-axis current deviation Δiq to the current control unit 42.

The current control unit 42 performs feedback control such that the d-axis difference current Δid the q-axis current deviation Δiq each indicating a deviation between a command value that is a target value and a measured value that is an output value become zero, and calculates and outputs a d-axis voltage command Vd* and a q-axis voltage command Vq* as voltage commands in order to update the output values. The feedback control in the current control unit 42 is performed by, for example, PI control.

The d-axis voltage command value Vd* and the q-axis voltage command value Vq* output from the current control unit 42 are input to the two-phase/three-phase conversion unit 43, thereby calculating and outputting three-phase voltage command values Vu*, Vv*, and Vw* based on the magnetic pole position signal 9 (θ).

The beat suppression control unit 46 and a beat compensation amount subtraction unit 49 are processes related to the present invention, and are not used in typical current vector control.

Therefore, in the typical current vector control, the three-phase voltage command values Vu*, Vv*, and Vw*, which are the outputs of the two-phase/three-phase conversion unit 43, are input to the PWM gate control signal generation unit 45 without any processing.

In the typical current vector control, the PWM gate control signal generation unit (control signal generation unit) 45 compares the three-phase voltage command values Vu*, Vv*, and Vw* with a carrier carrier wave (not illustrated) to generate the six gate signals 32, which are PWM signals, and outputs the gate signals to the gate drive circuit 35.

In the first embodiment, so-called asynchronous PWM in which the switching frequency of the inverter 1 does not continuously change according to the velocity (frequency) of the motor 2 is adopted. Therefore, the frequency (carrier frequency) of the carrier carrier wave does not continuously change according to the velocity.

The above is the typical control processing of the controller 4.

Next, a principle of occurrence of a current beat phenomenon, which is a problem in the present invention, will be summarized.

Factors that cause a current beat include the following.

(1) A phenomenon due to a pulsation of an input DC voltage of an inverter.

(2) A phenomenon due to an error of a current detection value used for current vector control, errors of a magnetic pole position signal and an estimated value, and an electrical and mechanical structure of a motor.

(3) A phenomenon due to a voltage difference between a positive output and a negative output of an inverter.

(1) relates to a phenomenon that is likely to occur mainly in a system connected to an AC power system and in which a power pulsation when system power is rectified to DC by a rectifier causes a beat of an AC current of an inverter. A frequency of a current beat is uniquely determined by a relationship between a pulsation frequency of a DC voltage and a fundamental frequency of the inverter. Techniques described in PTL 2, PTL 3, and PTL 4 are directed to this phenomenon.

PTL 1 describes that (2) occurs when it is difficult to perform high-speed current vector control particularly in an overmodulation region or a rectangular wave driving region where a modulation rate of an inverter is great.

It is difficult to analytically obtain a frequency of a current beat, which is different from the phenomenon described in (1).

PTL 1 is directed to this phenomenon.

The present invention is directed to a current beat phenomenon according to (3). (3) occurs when a carrier frequency is not sufficient relative to a fundamental frequency. In particular, this remarkably occurs in a system that performs asynchronous PWM and an update timing of a voltage command value for each carrier cycle. It is difficult to analytically obtain a frequency of a current beat, which is similarly to the phenomenon described in (2).

Next, beat suppression processing and a configuration of a control system according to the first embodiment of the present invention will be described.

As described above, the beat suppression control unit 46 and the beat compensation amount subtraction unit 49 are added to the controller 4.

The beat suppression control unit 46 is supplied with the phase currents iu, iv, and iw from the current sensor 10, and is supplied with the d-axis current command value id* and the q-axis current command value iq* from the current command calculation unit 40. Further, the beat current suppression control unit 46 is supplied with the magnetic pole position signal 9 (θ) from the magnetic pole position sensor 8, and is supplied with the angular velocity ω from the velocity calculation unit 44.

Then, the beat suppression control unit 46 detects beat components of the three-phase currents iu, iv, and iw, and outputs beat compensation voltages ΔVu, ΔVv, and ΔVw to the beat compensation amount subtraction unit 49**.

The beat compensation amount subtraction unit 49 subtracts the beat compensation voltages ΔVu, ΔVv, and ΔVw output from the beat suppression control unit 46**, from the three-phase voltage command values Vu*, Vv*, and Vw* output from the two-phase/three-phase conversion unit 43 to calculate new three-phase voltage command values (compensation three-phase voltage command values) Vu, Vv, and Vw to be input to the PWM gate control signal generation unit 45. The calculated compensation three-phase voltage command values Vu, Vv, and Vw are output to the PWM gate control signal generation unit 45. Then, the gate signal 32 is generated by the PWM gate control signal generation unit 45 and output to the gate drive circuit 35.

Figure 3:
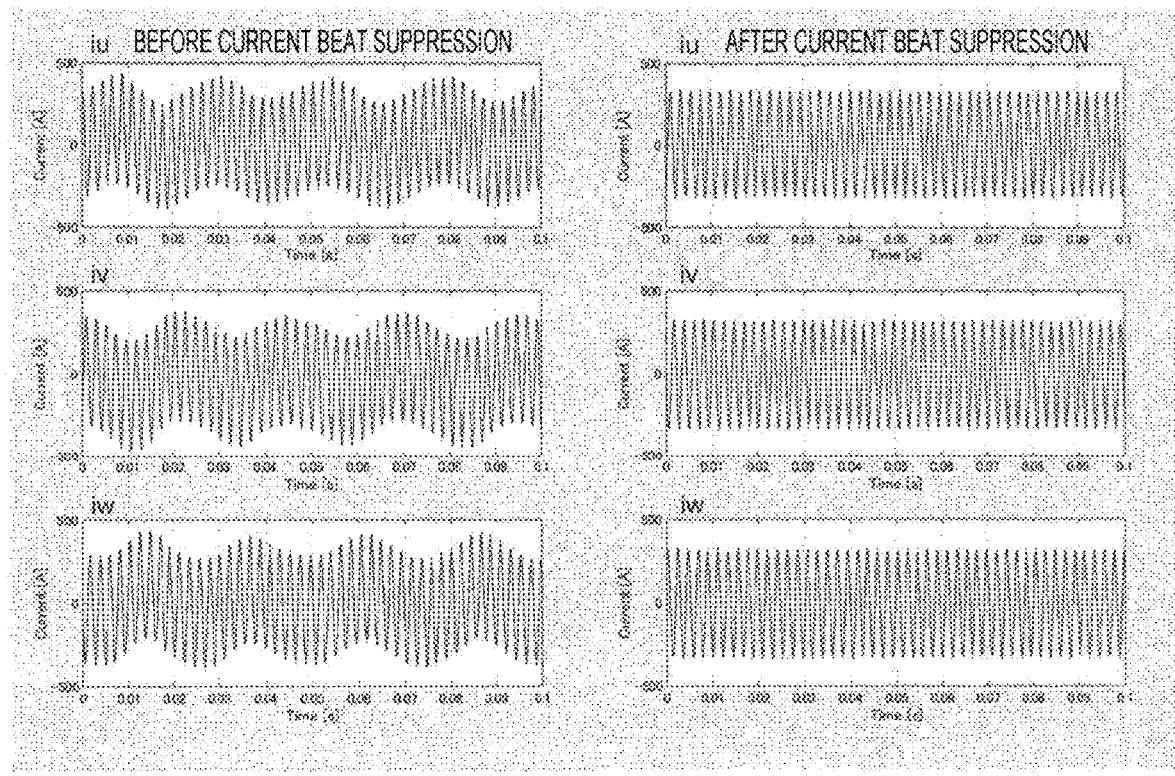
FIG. 3 is a view illustrating a three-phase current waveform (experimental waveform) when a current beat occurs due to a voltage difference between a positive output and a negative output of an inverter.

FIG. 3 is a view illustrating a three-phase current waveform (experimental waveform) when the above phenomenon of (3) occurs, that is, the current beat occurs due to the voltage difference between the positive output and the negative output of the inverter in the power conversion device illustrated in FIG. 1 of the first embodiment, which is the view illustrating an example in a case where a fundamental frequency is 500 Hz.

A waveform illustrated in (A) of FIG. 3 represents a waveform before current beat suppression, and (B) of FIG. 3 illustrates a waveform after the current beat is suppressed by the first embodiment of the present invention. Then, U-phase, V-phase, and W-phase currents are illustrated from the top in (A) and (B) of FIG. 3.

As illustrated in (A) of FIG. 3, it can be confirmed that a current beat of about 40 Hz occurs while the fundamental frequency of the current is 500 Hz.

On the other hand, as illustrated in (B) of FIG. 3, it can be confirmed that the current beat is suppressed from the currents iu, iv, and iw at the fundamental frequency of 500 Hz.

The first embodiment of the present invention is directed to the current beat phenomenon caused by the factor in (3), but the current beat can be suppressed even if the current beat phenomena occur due to the factors in (1) and (2).

Figure 4:
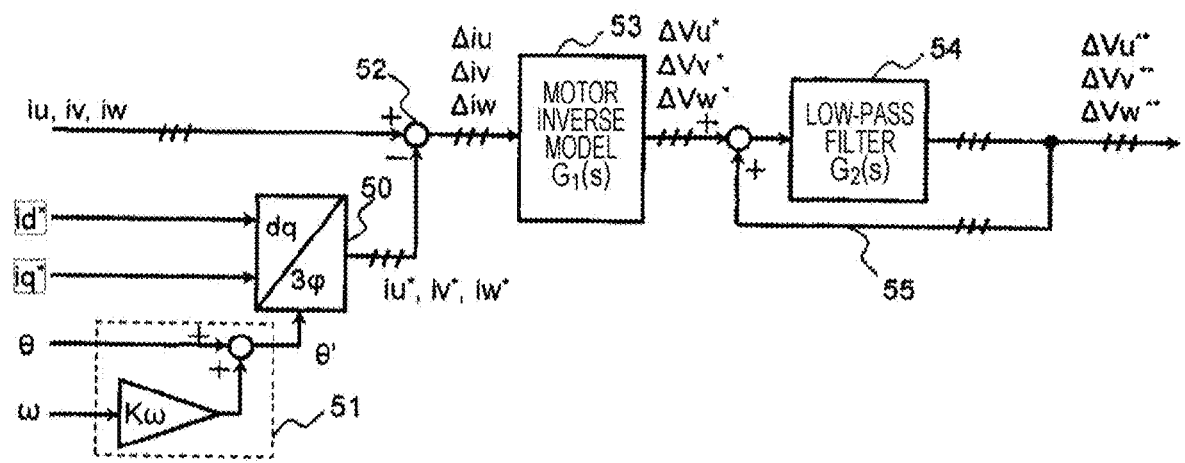
FIG. 4 is an internal block diagram illustrating a processing content of a beat suppression control unit according to the first embodiment.

FIG. 4 is an internal block diagram illustrating a processing content of the beat suppression control unit 46 according to the first embodiment of the present invention.

In FIG. 4, the beat suppression control unit 46 includes a two-phase/three-phase conversion unit 50, a magnetic pole position correction unit 51, a subtractor 52, a motor inverse model unit 53, a low-pass filter 54, and a feedback loop 55. The two-phase/three-phase conversion unit 50, the magnetic pole position correction unit 51, and the subtractor 52 form a beat extraction unit. The beat extraction unit calculates a current beat component of an output current of the inverter 1.

When a current beat phenomenon occurs in the phase currents iu, iv, and iw, the beat suppression control unit 46 estimates a disturbance voltage that generates such a current beat, and outputs beat compensation voltages (disturbance estimation voltages) ΔVu, ΔVv, and ΔVw**.

The two-phase/three-phase conversion unit 50 calculates three-phase current command values iu*, iv*, and iw* of the d-axis current command value id* and the q-axis current command value iq* from the current command calculation unit 40 based on a corrected magnetic pole position θ' output from the magnetic pole position correction unit 51.

The magnetic pole position correction unit 51 calculates a magnetic pole position correction angle Δθ from the angular velocity ω output from the velocity calculation unit 44 using an angle correction gain Kω, adds the magnetic pole position correction angle Δθ to the magnetic pole position signal 9 (θ) output from the magnetic pole position sensor 8, and calculates and outputs the corrected magnetic pole position θ'. The angle correction gain Kω is a dimension of time, and corrects a phase difference between each of the phase currents iu, iv, and iw and each of the phase current command values iu*, iv*, and iw* caused by a detection delay of the current sensor 10 or the like.

The subtractor 52 subtracts the phase current command values iu*, iv*, and iw* from the phase currents iu, iv, and iw to extract current beat components Δiu, Δiv, and Δiw.

The motor inverse model unit 53 receives the current beat components Δiu, Δiv, and Δiw from the subtractor 52, and outputs disturbance estimation voltages ΔVu*, ΔVv*, and ΔVw* that generate current beats. A function of the motor inverse model unit 53 is expressed by a transfer function $G_1(s)$ in the following Formula (2).

$$G_1(s) = K_1 s/(T_d s + 1) + K_0 \quad (2)$$

In the above Formula (2), s is a Laplace operator, Td is a pseudo differentiator time constant, and $K_1$ and $K_0$ are control gains.

Since a pure inverse model includes a differential operation, the first item on the right side of the above Formula (2) is a pseudo differentiator (high-pass filter).

The low-pass filter 54 removes noise superimposed on the disturbance estimation voltages ΔVu*, ΔVv*, and ΔVw* output from the motor inverse model unit 53, and outputs the beat compensation voltages ΔVu, ΔVv, and ΔVw. Since a noise component is sometimes amplified by the motor inverse model unit 53, the noise component is removed by the low-bus filter 54**.

A function of the low-pass filter 54 is expressed by a transfer function in the following Formula (3).

$$G_2(s) = 1/(T_L s + 1) \quad (3)$$

In the above Formula (3), TL is a low-pass filter time constant. Usually, the time constants are set as TL≫Td.

The feedback loop 55 feeds back the beat compensation voltages ΔVu, ΔVv, ΔVw to the input of the low-pass filter 54. With this feedback loop, the beat current is completely suppressed by the beat suppression control, and the beat compensation voltages ΔVu, ΔVv, and ΔVw hold outputs even when ΔVu*, ΔVv*, and ΔVw* become zero, so that the compensation can be continued.

As described above, in the first embodiment of the present invention, the beat extraction unit extracts the current beat components Δiu, Δiv, and Δiw from the three-phase current signals iu, iv, and iw detected by the current sensor 10, the motor inverse model unit 53 converts the extracted current beat components Δiu, Δiv, and Δiw into the disturbance estimation voltages ΔVu*, ΔVv*, and ΔVw*, and the low-pass filter 54 removes the noise, thereby estimating the beat compensation voltages ΔVu, ΔVv, and ΔVw. Then, the estimated beat compensation voltages ΔVu, ΔVv, and ΔVw are subtracted from the three-phase voltage command values Vu*, Vv*, and Vw* by the beat compensation amount subtraction unit 49 to perform compensation, and are supplied to the PWM gate control signal generation unit 45 that drives the inverter 1. The gate signal 32 is supplied from the PWM gate control signal generation unit 45 to the gate drive circuit 35, and the gate drive signals 26 to 31 are output to the inverter 1 that drives the motor 2.

Therefore, it is possible to realize the power conversion device that does not require adaptation work and can suppress the current beat regardless of an operation state of the motor according to the first embodiment.

Second Embodiment

Next, a second embodiment of the present invention will be described.

Figure 5:
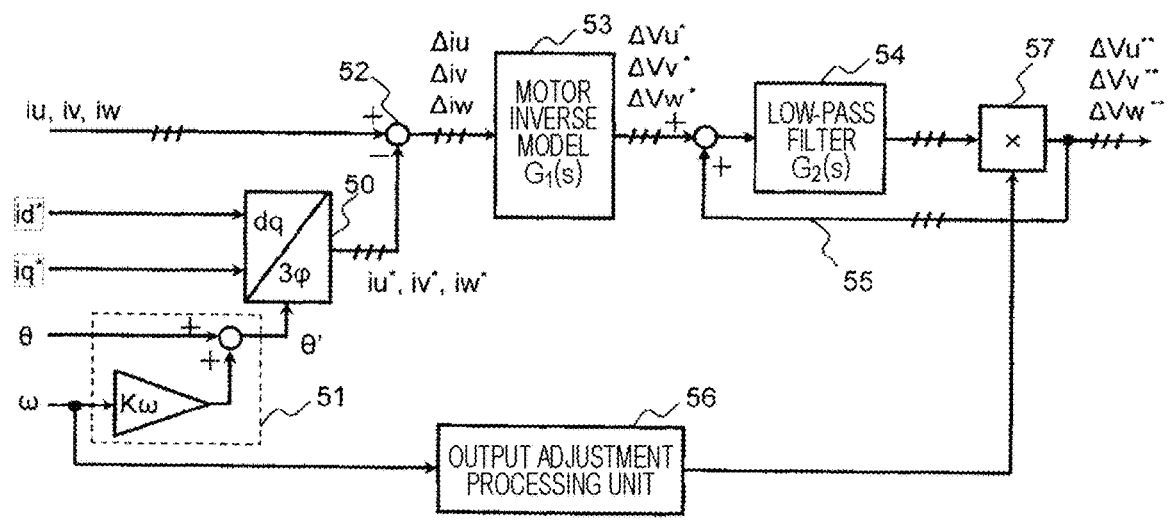
FIG. 5 is an internal block diagram illustrating a processing content of a beat suppression control unit according to a second embodiment.

FIG. 5 is an internal block diagram illustrating a processing content of the beat suppression control unit 46 according to a second embodiment of the present invention.

In an example illustrated in FIG. 5, an output adjustment processing unit 56 and an output adjustment multiplier 57 are added to the internal block of the beat suppression control unit 46 illustrated in FIG. 4 of the first embodiment. Other configurations in the second embodiment are the same as those in the first embodiment, and thus, the illustration and detailed description thereof will be omitted.

When the velocity of the motor 2 is low and an assumed frequency of a current beat component is close to a fundamental frequency of a phase current, there is a possibility that it is difficult for the beat suppression control unit 46 to correctly calculate a beat compensation voltage.

Further, the velocity of the motor 2 is very high, the influence of a detection delay or a calculation delay of the three-phase currents iu, iv, and iw becomes great, and it is difficult to extract a correct beat current with the subtractor 52. In such a case, an operation of the current control unit 42 is affected, and there is a possibility that it is difficult to correctly control an output torque of the motor 2.

Since the output adjustment processing unit 56 stops beat compensation in a velocity region where a problem is likely to occur in an operation of the beat suppression control unit 46, the influence of the malfunction can be eliminated. That is, the operation of suppressing the beat component is stopped according to the angular velocity ω calculated by the velocity calculation unit 44.

In FIG. 5, the output adjustment processing unit 56 receives the angular velocity ω of the motor 2, that has been subjected to absolute value processing, and adjusts the beat compensation voltages ΔVu, ΔVv, and ΔVw output from the low-pass filter 54 according to the angular velocity of the motor 2**.

Figure 6:
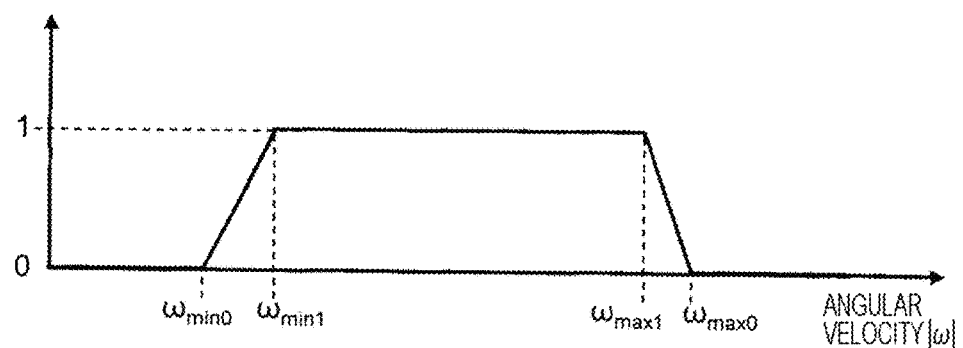
FIG. 6 is a graph for describing processing of an output adjustment processing unit in the second embodiment.

FIG. 6 is a graph for describing processing of the output adjustment processing unit 56 in the second embodiment.

In FIG. 6, the vertical axis represents an output value of the output adjustment processing unit 56, and the horizontal axis represents the angular velocity ω from the velocity calculation unit 44 input to the output adjustment processing unit 56.

When the motor 2 is operated at an angular velocity between angular velocities $\omega_{min1}$ and $\omega_{max1}$, the beat suppression control unit 46 performs beat compensation. That is, the output value of the output adjustment processing unit 56 is 1, and is supplied to the output adjustment multiplier 57, and an output from the low-pass filter 54 is multiplied by 1, whereby the output from the low-pass filter 54 is output to the beat compensation amount subtraction unit 49.

The beat compensation is stopped when the motor 2 is operated at an angular velocity that is equal to or lower than the angular velocity $\omega_{min0}$ (minimum velocity (first angular velocity)) or is equal to or higher than $\omega_{max0}$ (maximum velocity (fourth angular velocity)). That is, the output value of the output adjustment processing unit 56 is 0, and is supplied to the output adjustment multiplier 57, and an output from the low-pass filter 54 is multiplied by 0, whereby the output from the low-pass filter 54 is not output to the beat compensation amount subtraction unit 49.

Until the velocity becomes equal to or lower than $\omega_{min1}$ (second angular velocity) after exceeding the angular velocity $\omega_{min0}$ (first angular velocity), the output value of the output adjustment processing unit 56 increases gradually from 0 to 1 with an arbitrary gradient.

Further, until the velocity becomes $\omega_{max0}$ (fourth angular velocity) after becoming equal to or higher than the angular velocity $\omega_{max1}$ (third angular velocity), the output value of the output adjustment processing unit 56 gradually decreases from 1 to 0 with an arbitrary gradient.

In this manner, the beat compensation amount is increased or decreased with an arbitrary gradient in the angular velocity from the angular velocity $\omega_{min0}$ to $\omega_{min1}$ and the angular velocity from the angular velocity $\omega_{max1}$ to $\omega_{max0}$.

As described above, it is possible to realize a power conversion device that does not require adaptation work and can suppress the current beat regardless of an operation state of the motor according to the second embodiment of the present invention, which is similar to the first embodiment.

Furthermore, the beat compensation is stopped in a velocity region where the velocity of the motor 2 is equal to or lower than the minimum velocity and a velocity region where the velocity is equal to or higher than the maximum velocity according to the second embodiment. Thus, the output torque of the motor 2 can be correctly controlled even in a case where the velocity of the motor 2 is low and the assumed frequency of the current beat component is close to the fundamental frequency of the phase current or even in a case where the velocity of the motor 2 is very high and the influence of the detection delay or the calculation delay of the three-phase currents iu, iv, and iw becomes great.

Note that the beat compensation amount is increased or decreased with an arbitrary gradient at the angular velocity between the angular velocity $\omega_{min0}$ and $\omega_{min1}$ and the velocity between the angular velocity $\omega_{max1}$ and $\omega_{max0}$. However, instead of increasing or decreasing the beat compensation amount with an arbitrary gradient, the output value of the output adjustment processing unit 56 may be set to 1 when the velocity becomes equal to or higher than $\omega_{min1}$, the output value may be decreased to 0 from 1 when the angular velocity becomes equal to or higher than $\omega_{max1}$, and the output value may be set to 0 when the velocity becomes lower than $\omega_{min1}$.

Third Embodiment

Next, a third embodiment of the present invention will be described.

The third embodiment is an example of a motor vehicle system including a power conversion device.

Figure 7:
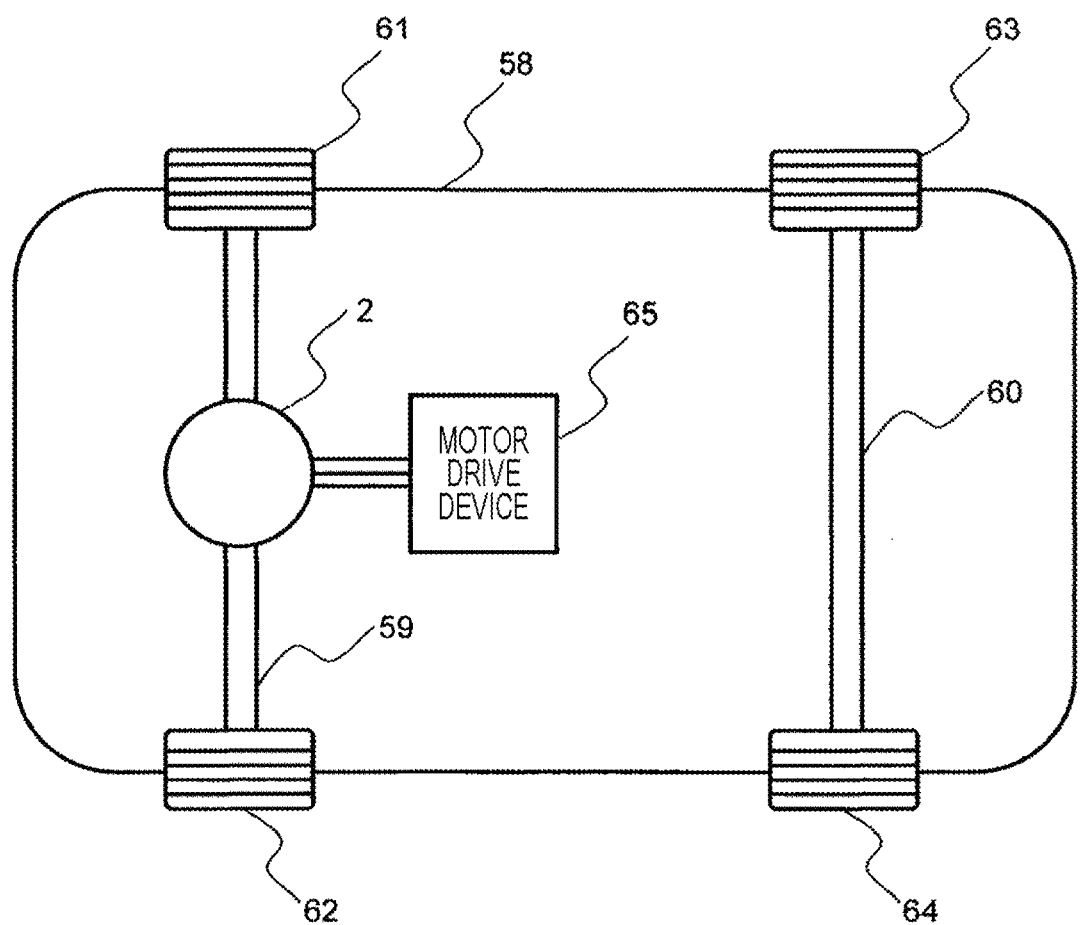
FIG. 7 is a schematic configuration diagram of a motor vehicle system according to a third embodiment.

FIG. 7 is a schematic configuration diagram of the motor vehicle system according to the third embodiment of the present invention.

Here, an example of the motor vehicle system equipped with the power conversion device of either the first embodiment or the second embodiment will be described.

As illustrated in FIG. 7, in a motor vehicle system 58, a pair of axles 59 and 60 are pivotally supported on a vehicle body. A wheel 61 and a wheel 62 are fixed to both ends of one axle 59, and a wheel 63 and a wheel 64 are fixed to both ends of the other axle 60. The motor 2 is connected to the one axle 59, and the rotational power of the motor 2 is transmitted to the wheels 61 and 62 via the axle 59.

A motor drive device (motor control device) 65 receives a command torque T* generated by a host system such as an ECU and drives the motor 2. The motor drive device 65 includes the power conversion device of the first or second embodiment.

In a case where the present invention is applied to the motor vehicle system 58, it is possible to avoid a problem that overcurrent protection works due to a current beat and an inverter stops.

Therefore, the operation quality of the motor vehicle system 58 can be improved, and the reliability can be improved.

Further, it is possible to suppress deterioration in motor efficiency due to a current beat phenomenon according to the present invention. As a result, the improvement in electricity cost can be expected in the motor vehicle system 58.

Although the beat suppression control unit 46 and the beat compensation amount subtraction unit 49 are separately provided in FIG. 2 in the above-described embodiment, it is also possible to adopt a configuration in which the beat suppression control unit 46 includes the beat compensation amount subtraction unit 49 such that the three-phase voltage command value from the two-phase/three-phase conversion unit 43 is output to the beat compensation amount subtraction unit 49. The configuration in which the beat suppression control unit 46 includes the beat compensation amount subtraction unit 49 is defined as a beat compensation unit.

Further, the motor inverse model unit 53 and the low-pass filter 54 are separately provided in FIG. 4 in the above-described embodiment, but the motor inverse model unit 53 and the low-pass filter 54 may be integrally configured as one functional block. The motor inverse model unit 53 and the low-pass filter 54 as one functional block are defined as a beat compensation voltage calculation unit. The beat compensation voltage calculation unit estimates a voltage that generates a current beat component of the inverter 1.

Further, the output adjustment processing unit 56 and the output adjustment multiplier 57 can be configured as one functional block. The output adjustment processing unit 56 and the output adjustment multiplier 57 as one functional block can be defined as an output adjustment unit.

Incidentally, the present invention is not limited to the above-described embodiments, but includes various modifications.

For example, the above-described examples have been described in detail in order to describe the present invention in an easily understandable manner, and are not necessarily limited to one including the entire configuration that has been described above.

Further, a part of the configuration of a certain embodiment can be replaced with the configuration of another embodiment, and the configuration of another embodiment can be added to the configuration of a certain embodiment.

Further, addition, deletion or substitution of other configurations can be made with respect to some configurations of each embodiment. Examples thereof are illustrated as follows.

The switching element used in the inverter 1 is not limited to the Si-IGBT. The switching element may be replaced from the Si-IGBT to a SiC-MOSFET.

The motor 2 is not limited to the IPMSM. For example, the motor 2 may be replaced with a surface magnet type synchronous motor or an induction motor.

Further, a DC voltage source of the inverter 1 is not limited to a battery. In a system connected to an AC power system, AC power of the system may be rectified into DC by a rectifier to obtain a DC voltage source.

REFERENCE SIGNS LIST 1 inverter
2 motor
3 battery
4 controller
5, 6, 7 three-phase winding
8 magnetic pole position sensor
9($\theta$) magnetic pole position signal
10 current sensor
11, 12, 13 phase current sensor signal
14 to 19 switching element
20 to 25 freewheeling diode
26 to 31 gate drive signal
32 gate signal 33 high-potential DC wiring
34 low-potential DC wiring
35 gate drive circuit
36 voltage sensor
37 DC voltage sensor signal
38 smoothing capacitor
39 torque command
40 current command calculation unit
41 three-phase/two-phase conversion unit
42 current control unit
43, 50 two-phase/three-phase conversion unit
44 velocity calculation unit
45 PWM gate control signal generation unit (control signal generation unit)
46 beat suppression control unit
47, 48 deviation calculator
49 beat compensation amount subtraction unit
51 magnetic pole position correction unit
52 subtractor
53 motor inverse model unit
54 low-pass filter
55 feedback loop
56 output adjustment processing unit
57 output adjustment multiplier
58 motor vehicle system
59, 60 axle
61 to 64 wheel
65 motor drive device (motor control device)

The invention claimed is:

1. A power conversion device comprising:
an inverter that converts a DC voltage into an AC voltage and drives an AC motor; and
a beat compensation unit that suppresses a current beat component of an output current of the inverter,
wherein the beat compensation unit includes a beat extraction unit that calculates a beat component of the output current of the inverter and a beat compensation voltage calculation unit that estimates a beat compensation voltage from the beat component calculated by the beat extraction unit, and suppresses the current beat component of the output current of the inverter based on the beat compensation voltage estimated by the beat compensation voltage calculation unit.

2. The power conversion device according to claim 1, further comprising:
a three-phase voltage command value generation unit that generates a three-phase voltage command value; and
a control signal generation unit that generates a drive signal for driving the inverter,
wherein the beat compensation unit includes:
a beat suppression control unit that outputs a beat compensation voltage; and
a beat compensation amount subtraction unit that subtracts the beat compensation voltage output from the beat suppression control unit, from the three-phase voltage command value output from the three-phase voltage command value generation unit to output a subtraction result to the control signal generation unit.

3. The power conversion device according to claim 2, wherein
the beat compensation voltage calculation unit includes:
a motor inverse model unit that calculates a disturbance estimation voltage from a current beat component output from the beat extraction unit; and
a low-pass filter that removes noise of the disturbance estimation voltage output from the motor inverse model unit.

4. The power conversion device according to claim 1, further comprising:
a velocity calculation unit that calculates an angular velocity of a motor; and
an output adjustment unit that stops a beat component suppression operation performed by the beat compensation unit according to the angular velocity calculated by the velocity calculation unit.

5. The power conversion device according to claim 4, wherein
the output adjustment unit stops the beat component suppression operation when the angular velocity is equal to or lower than a first angular velocity and when the angular velocity is equal to or higher than a fourth angular velocity.

6. The power conversion device according to claim 5, wherein
the output adjustment unit increases the beat component suppression operation gradually from the first angular velocity to a second angular velocity when the angular velocity exceeds the first angular velocity and is equal to or lower than the second angular velocity, and decreases the beat component suppression operation gradually from a third angular velocity to the fourth angular velocity when the angular velocity exceeds the third angular velocity and is equal to or lower than the fourth angular velocity.

7. A motor vehicle system comprising:
a motor that drives a vehicle; and
a motor control device that controls the motor,
wherein the motor control device includes a power conversion device,
the power conversion device includes:
an inverter that converts a DC voltage into an AC voltage and drives an AC motor; and
a beat compensation unit that suppresses a current beat component of an output current of the inverter, and
the beat compensation unit includes a beat extraction unit that calculates a beat component of the output current of the inverter and a beat compensation voltage calculation unit that estimates a beat compensation voltage from the beat component calculated by the beat extraction unit, and suppresses the current beat component of the output current of the inverter based on the beat compensation voltage estimated by the beat compensation voltage calculation unit.

8. The motor vehicle system according to claim 7, wherein
the power conversion device further includes:
a three-phase voltage command value generation unit that generates a three-phase voltage command value; and
a control signal generation unit that generates a drive signal for driving the inverter, and
the beat compensation unit includes:
a beat suppression control unit that outputs a beat compensation voltage; and
a beat compensation amount subtraction unit that subtracts the beat compensation voltage output from the beat suppression control unit, from the three-phase voltage command value output from the three-phase voltage command value generation unit to output a subtraction result to the control signal generation unit.

9. The motor vehicle system according to claim 8, wherein
the beat compensation voltage calculation unit includes:
a motor inverse model unit that calculates a disturbance estimation voltage from a current beat component output from the beat extraction unit; and
a low-pass filter that removes noise of the disturbance estimation voltage output from the motor inverse model unit.

10. The motor vehicle system according to claim 7, wherein
the power conversion device further includes:
a velocity calculation unit that calculates an angular velocity of the motor; and
an output adjustment unit that stops a beat component suppression operation performed by the beat compensation unit according to the angular velocity calculated by the velocity calculation unit.

11. The motor vehicle system according to claim 10, wherein
the output adjustment unit stops the beat component suppression operation when the angular velocity is equal to or lower than a first angular velocity and when the angular velocity is equal to or higher than a fourth angular velocity.

12. The motor vehicle system according to claim 11, wherein
the output adjustment unit increases the beat component suppression operation gradually from the first angular velocity to a second angular velocity when the angular velocity exceeds the first angular velocity and is equal to or lower than the second angular velocity, and decreases the beat component suppression operation gradually from a third angular velocity to the fourth angular velocity when the angular velocity exceeds the third angular velocity and is equal to or lower than the fourth angular velocity.

\* \* \* \* \*